(12) United States Patent
Berger et al.

(10) Patent No.: US 8,065,196 B1
(45) Date of Patent: Nov. 22, 2011

(54) SYSTEM AND METHOD FOR PROCESSING PERSONALIZED STATIONERY DESIGNS AND SELECTING FULFILLMENT ORDER SITES

(75) Inventors: Kelly Berger, Los Altos, CA (US); Colin Crisanti, San Jose, CA (US); Jim Reed, San Jose, CA (US)

(73) Assignee: Shutterfly, Inc., Redwood City, CA (US)

( * ) Notice: Subject to any disclaimer, the term of this patent is extended or adjusted under 35 U.S.C. 154(b) by 0 days.

(21) Appl. No.: 13/212,374

(22) Filed: Aug. 18, 2011

Related U.S. Application Data

(63) Continuation of application No. 12/638,851, filed on Dec. 15, 2009, now Pat. No. 8,024,233.

(51) Int. Cl.
*G06Q 30/00* (2006.01)
(52) U.S. Cl. ........................................ 705/26.5
(58) Field of Classification Search ............ 705/26, 705/26.5, 27
See application file for complete search history.

(56) References Cited

U.S. PATENT DOCUMENTS

| 2003/0140315 A1 | 7/2003 | Blumberg |
| 2004/0003342 A1 | 1/2004 | Keane |
| 2009/0070176 A1* | 3/2009 | Altice et al. ............ 705/8 |

OTHER PUBLICATIONS

Mahar, Stephen, Ph. D "Inventory and distribution strategies for retail/e-tail organizations," 2005, Indiana University.*

* cited by examiner

*Primary Examiner* — Jeffrey A Smith
*Assistant Examiner* — Brandy A Zukanovich
(74) *Attorney, Agent, or Firm* — Xin Wen

(57) ABSTRACT

A system and method are described for digitally processing a stationery order and for selecting an optimum fulfillment site for fulfilling the stationery order. For example, a method according to one embodiment of the invention comprises: providing an end user with a set of selectable stationery templates, the stationery personalization engine receiving an indication that an end user has selected a particular one of the stationery templates; collecting personalization data from the user, the personalization data including personalized messages, one or more stationery formatting options selected by the user, and names and addresses of stationery recipients; applying the personalization data to the stationery templates to generate a personalized stationery design; identifying a set of eligible fulfillment sites for printing the stationery design based on a first set of variables; and identifying an optimal fulfillment site from the set of eligible fulfillment sites based on a second set of variables.

19 Claims, 2 Drawing Sheets

SYSTEM AND METHOD FOR PROCESSING PERSONALIZED STATIONERY DESIGNS AND SELECTING FULFILLMENT ORDER SITES

PRIORITY PATENT APPLICATIONS

The present patent application is a continuation application of and claims priority to commonly assigned U.S. patent application Ser. No. 12/638,851, entitled "Systems and methods for processing personalized stationery designs and selecting fulfillment order sites", filed Dec. 15, 2009 now U.S. Pat. No. 8,024,233 by the same inventors, the disclosure of which is incorporated herein by reference.

FIELD OF THE INVENTION

This invention relates generally to the field of network data processing systems. More particularly, the invention relates to an improved architecture and method for processing personalized stationery designs and selecting fulfillment order sites.

BACKGROUND OF THE INVENTION

Web-based systems for designing stationery such as wedding invitations, birth announcements, thank you cards, birthday party invitations, etc, are currently available over the Internet. One such service, provided by the assignee of the present application, can be found at the Tinyprints website. This online stationery service allows users to select from a variety of different stationery categories. Upon selection of a particular category, multiple stationery design options are provided for that category. The user may then choose a particular stationery design and personalize the design to place a stationery order (e.g., by entering a personalized message, colors, etc).

Once a user has personalized a stationery design and placed an order, the stationery must be printed, either at the online stationery site or at an external printing service. Currently, no mechanism exists for selecting an optimal destination for printing stationery designs and/or for reviewing personalized online stationery orders.

Consequently, what is needed is an automated, efficient system and method for processing and selecting an optimal destination for printing online stationery designs.

SUMMARY OF THE INVENTION

A system and method are described for digitally processing a stationery order and for selecting an optimum fulfillment site for fulfilling the stationery order. For example, a method according to one embodiment of the invention comprises: providing an end user with a set of selectable stationery templates, the stationery personalization engine receiving an indication that an end user has selected a particular one of the stationery templates; collecting personalization data from the user, the personalization data including personalized messages, one or more stationery formatting options selected by the user, and names and addresses of stationery recipients; applying the personalization data to the stationery templates to generate a personalized stationery design; identifying a set of eligible fulfillment sites for printing the stationery design based on a first set of variables; and identifying an optimal fulfillment site from the set of eligible fulfillment sites based on a second set of variables.

BRIEF DESCRIPTION OF THE DRAWINGS

A better understanding of the present invention can be obtained from the following detailed description in conjunction with the following drawings, in which.

DETAILED DESCRIPTION OF THE INVENTION

Described below is a system and method for selecting an optimal destination for printing stationery designs. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

It should be noted that the term "stationery" is used herein to refer to cards, invitations (e.g., wedding, birthday invitations, etc), and any other form of written communication and/or images printed on a medium (e.g., paper, fabric, etc) using any form of printing device.

Figure 1:
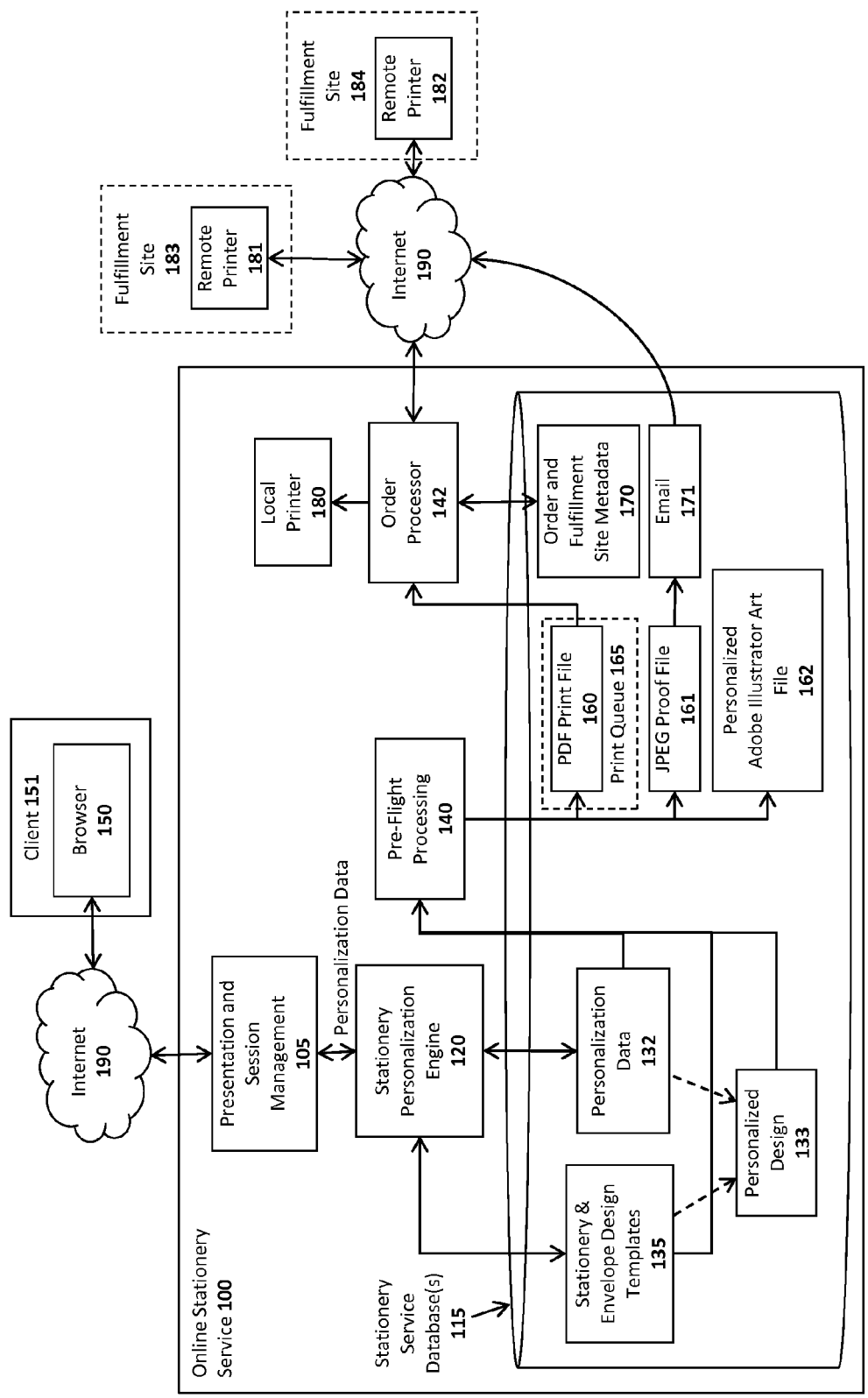
FIG. 1 illustrates one embodiment of a system architecture for fulfilling an order including selecting an optimal printing destination.

FIG. 1 illustrates one embodiment of a system architecture for fulfilling an order including selecting an optimal destination for printing stationery designs. In one embodiment, a client 151 connects to the online stationery service 100 over a wide area network (WAN) 190 (e.g., the Internet) using a browser application such as Microsoft's Internet Explorer® or Mozilla's Firefox®. Presentation and session management logic 105 executed within the online stationery service 100 establishes network communication sessions with the browser 150 and generates Web-based graphical user interface (GUI) features for personalizing stationery such as those described in the co-pending application entitled SYSTEM AND METHOD FOR DESIGNING AND GENERATING ONLINE STATIONERY, Ser. No. 12/188,721, filed Aug. 8, 2008, which is assigned to the assignee of the present application and which is incorporated herein by reference. In particular, a stationery personalization engine 120 provides the functionality for selecting a particular stationery/envelope design template 135 and personalizing the stationery design template by entering a personalized message, selecting particular colors, fonts and font sizes, selecting a particular text layout, etc, to generate a personalized stationery/envelope design 133. The personalization data 132, the stationery/envelope design templates 135, and the personalized stationery design 133 are stored and managed within the stationery service database 115 (or other suitable storage medium). In one embodiment, the stationery service database 115 is implemented as a MySQL database. However, various different database formats may be employed while still complying with the underlying principles of the invention (e.g., Microsoft SQL, IBM SQL, etc).

Various well known functional modules associated within the presentation and session management logic 105 are executed to receive user input, process the input, interact with one or more other modules shown in FIG. 1, and dynamically generate Web pages containing the results. The Web pages are then transmitted to the user's client computer 151 and rendered on the browser 150. The Web pages may be formatted according to the well known HyperText Markup Language ("HTML") or Extensible HTML ("XHTML") formats, and may provide navigation to other Web pages via hypertext links. One embodiment utilizes Dynamic HTML ("DHTML"), a collection of technologies used together to create interactive Web sites by using a combination of a static markup language (e.g., HTML), a client-side scripting language (e.g., JavaScript), a presentation definition language (e.g., CSS), and the Document Object Model ("DOM").

Once a stationery design 133 has been completed, the user enters order information such as user name, payment type, billing address, etc, to place an order. Various well-known functional modules for processing the order information are not shown in FIG. 1 to avoid obscuring the underlying principles of the invention.

Once the order information submitted by the user has been verified, customer care, production design specialists and production quality assistance personnel at the online stationery service review all ordered items. In one embodiment, the review team checks spelling, grammar, type setting, picture quality, and fonts, to ensure that the information in the personalized stationery design 133 is accurate and to ensure that the stationery will print correctly.

In one embodiment, import scripts are executed to open the product design template files and pull personalized photos and text. After verifying the details and quality of the personalized design, a pre-flight processing module 140 executed on the stationery design service generates a plurality of different file formats for the personalized stationery design. In particular, as illustrated in FIG. 1, the pre-flight processing module 140 generates an Adobe® Portable Document Format ("PDF") print file 160 to be used for printing the stationery design (as described below). In one embodiment, the print file 160 is queued within a print queue 165 prior to printing and it subsequently forwarded to one or more local printers 180 or remote printers 181-182. The PDF print file 160 may be queued within the print queue for a specified amount of time prior to printing (e.g., 15 minutes), to allow sufficient time for additional review. When initially placed in the print queue 165, the status of the PDF print file 160 is set to "reviewed" and after the specified period of time, the status is set to "ready-to-print." The PDF print file 160 and associated metadata 170 may then be selected by the order processor for printing. The foregoing status indicators allow the internal review teams of the online stationery service 100 to cancel an order if it moved to "reviewed" by mistake. While a PDF file is described above, various other file formats suitable for printing may be used while still complying with the underlying principles of the invention (e.g., PostScript file, image files, etc).

In addition, in one embodiment, the pre-flight processing module 140 generates a JPEG proof file 161 which may be sent to the end user for final review. In one embodiment, the JPEG proof file 161 is encapsulated/attached to an email message and emailed to the user via email module 171. Alternatively, or in addition, the JPEG proof file 161 may be encapsulated in a Web page by presentation and session management logic 105 and reviewed within the user's browser 150. While a JPEG image is described above, various other image formats may be employed while still complying with the underlying principles of the invention (e.g., GIF, Bitmap, TIFF, etc).

Additionally, in one embodiment, the pre-flight processing module 140 pulls personalized text and photo images from the personalization data 132 and overlays the text and images on the stationery design template 135 which, as described in the co-pending applications, is an Adobe Illustrator (AI) file. The end result is a personalized AI file 162 containing the user's personalization data. In one embodiment, the AI file 162 is used as an archive of the user's order. The AI file 162 may subsequently be retrieved and modified and/or additional orders may be placed using the AI file 162. In one embodiment, the AI file 162 and the personalized design 133 shown in FIG. 1 are different formats of the same file. However, the same or different file formats may also be used while still complying with the underlying principles of the invention.

In one embodiment, an order processor 142 first validates each order to determine if the order is complete (e.g., checking the status of the print file and payment confirmation) and then selects a printing destination for the order. In one embodiment, the order processor 142 selects from among a plurality of fulfillment sites 183-184 and/or one or more local printers 180 by evaluating order data and metadata 170 associated with the order and the various fulfillment sites. In one embodiment, the order processor 142 initially determines a set of eligible fulfillment sites 183-184 based on the metadata 170 which may include, but is not limited to the following: producttype (e.g., digital press cards, letterpress cards, address labels, envelopes); the shipping address (e.g., country, state, city, postal code); the product size; the paper type; and whether a Printed Return Address (PRA) is required on the envelopes order.

Examples of product type, product size and paper type include, but are not limited to the following:
Product Types:
Digital Press Card
Address Label
Gift Tag
Thermography Card
Photo Gifts
Canvas Gifts
Envelopes
Gift Certificates
Mint Tins
Product Sizes:
5×7 inch Flat Card
5×7 inch Folded Card
3.5×5 inch Flat Card
3.5×5 inch Folded Card
4×9 inch Flat Card
4×9 inch Folded Card
Paper Types:
110 lb White Smooth Matte Cardstock
110 lb Recycled White Matte
110 lb White Textured Cardstock
80 lb White Textured Cardstock By way of example, if a particular fulfillment site does not offer certain product types, then it will be excluded from an order which requires printing of those product types. Similarly, if a particular stationery order requires envelopes with printed return address, then those fulfillment sites which do not support printed return address will be excluded from the set of eligible sites.

In one embodiment, once the order processor 142 has selected a set of eligible sites (and if there is more than one eligible site), it selects an "optimum" site based on the printing quota at each of the fulfillment sites. Specifically, in one embodiment, ratios are used to determine how to allocate orders to fulfillment sites 183-184. Some fulfillment sites are set to a quota value of "1" and orders are distributed evenly among these sites. Thus, if there are two fulfillment sites with quota values of 1, the ratio would be 1:1 and orders would be evenly distributed among the two fulfillment sites (i.e., for every order sent to one site another order would be sent to the next site).

Quota values of less than 1 are used to limit the number of orders sent to certain sites. For example, if there are two sites with quota values of 1 and one site with a quota value of 0.5, the sites with the quota value of 1 would receive twice as many print orders as the site with the quota value of 0.5. For example, with a ratio of (1:1:0.5) and 25 orders, the first fulfillment site would get 10 orders, second 10 and third 5.

In one embodiment, the number of current orders assigned to each fulfillment site 183-184 are maintained within the stationery service database 115 (e.g., in a fulfillment site table). The order processor 142 performs the foregoing allocation by querying the database to retrieve this information and then dividing the number of current orders for a site by the ratio value assigned to that site. In one embodiment, the site with the lowest resulting value is selected for the next order. In one embodiment, if all ratios balance, the next printer will be selected in random order (or based on other variables described herein).

In one embodiment, the order processor 142 selects a fulfillment site based on variables other than quota. For example, the order processor 142 may select one eligible site over another eligible site based on the geographical location of the two sites—i.e., selecting the site which is closer to where the stationery order will be shipped. Similarly, the order processor 142 may factor in cost when selecting a site. For example, if one site is more expensive than another fulfillment site for a particular order, then the order processor 142 will select the less expensive site. Various other data may be evaluated by the order processor 142 to select a site while still complying with the underlying principles of the invention.

In one embodiment, once the fulfillment site is known, the order processor 142 creates a mapping of items within the order (i.e., "shopping cart" items) to fulfillment site Stock Keeping Units (SKUs) (i.e., unique identifiers for each order).

The order processor 142 then creates and transmits an XML file to the selected fulfillment site which contains all of the metadata needed to process the order, including the SKU mapping mentioned above. For example, the XML file specifies the product type, the paper/envelope type, the quantity, whether a Printed Return Address (PRA) is required and any other information needed to process the order. In one embodiment, the XML file contains the network location of the art files for the stationery order so that the fulfillment site can retrieve the art files after they receive the order (e.g., the PDF print file location). In one embodiment, the network location is specified as a unique Uniform Resource Identifier (URI) generated by the order processor 142.

In one embodiment, the XML file is transmitted using the specific protocols required by fulfillment site. The specific protocols may be determined by downloading and parsing the XML schema for that site (i.e., as part of a Web Services transaction).

After receiving and parsing the XML file, the fulfillment site retrieves the PDF print file 160 identified within the XML file and prints the stationery order. It then mails the stationery order to the recipients specified in the XML file. The order may be mailed to the user who placed the order and/or may be mailed directly to the stationery recipients. IN either case, the addressing information provided by the user is encapsulated within the XML file.

Once the order has been completed, the fulfillment site communicates this information to the online stationery service 100 which updates the order status within the database 115. In one embodiment, the online stationery service 100 periodically polls the fulfillment site for order status. Alternatively, some fulfillment sites automatically contact the online stationery service upon completion of an order.

Figure 2:
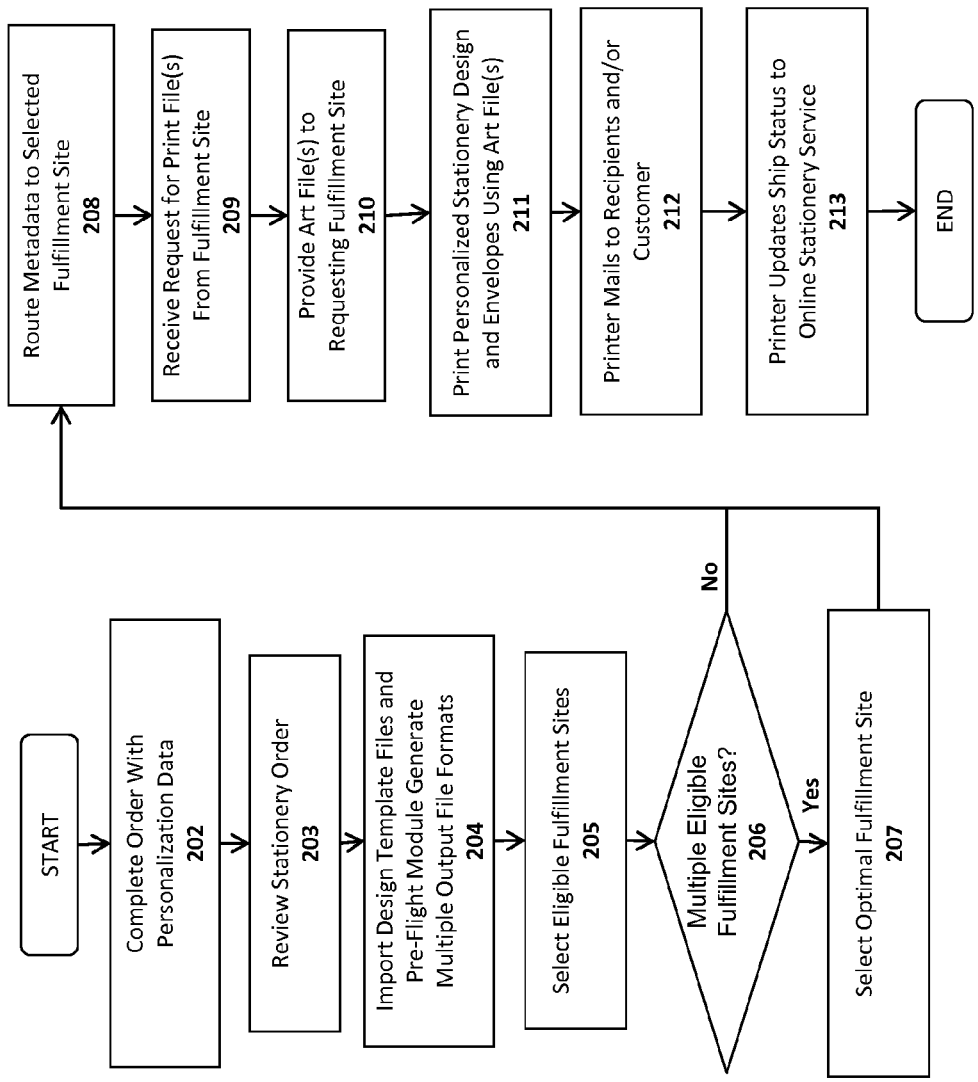
FIG. 2 illustrates one embodiment of a method for fulfilling an order including selecting an optimal printing destination.

FIG. 2 illustrates a method implemented in one embodiment of the invention. The method may be executed within the architecture shown in FIG. 1 or an alternative architecture. At 202, the end user completes a stationery order with personalization data. As previously mentioned, in one embodiment, the techniques described in the co-pending application entitled SYSTEM AND METHOD FOR DESIGNING AND GENERATING ONLINE STATIONERY, Ser. No. 12/188,721, filed Aug. 8, 2008 are employed for stationery personalization. At this stage the final, personalized stationery design 133 is generated. As mentioned above, in one embodiment, the personalized design 133 comprises a personalized AI file created by importing the user's personalization data (text, images, etc) into the stationery product template 135.

At 203, the online stationery service 100 performs an internal review of the stationery order. For example, an internal review team checks spelling, grammar, typesetting, picture quality, and fonts, to ensure that the information in the personalized stationery design 133 is accurate and to ensure that the stationery will print correctly.

At 204, multiple output formats are generated for the stationery order. In one embodiment, the output formats comprise a first format used for printing, a second format used as a proof for the end user and a third format used to archive the stationery order. For example, in the embodiment described above, the first format comprises a PDF format, the second format comprises a JPEG, and the third format comprises an AI file. Of course, the underlying principles of the invention are not limited to any particular set of data formats.

At 205, a set of eligible fulfillment sites are identified. The eligibility of fulfillment sites may be based on variables such as the capabilities of each site (e.g., some may not be capable of printing certain orders); the geographical location of each site (e.g., orders for US recipients should be printed by US companies to avoid additional shipping fees); and the type of products supported by each site (e.g., digital press cards, letter press cards, address labels, etc), to name a few. If only one fulfillment site is eligible, then the process jumps to 208.

If, however, multiple fulfillment sites are eligible then, as determined in step 206, at 207, an "optimal" fulfillment site is selected. As previously described, in one embodiment, the optimal site is selected based on the specified printing quota at each of the fulfillment sites and the number of current orders pending at each site. This effectively load balances stationery orders across the fulfillment sites based on the quota values assigned to each site. Various additional data may be factored in when choosing an "optimal" site including, for example, the geographical location of the fulfillment sites—i.e., selecting the site which is closer to the destination (s) of the stationery order. Similarly, cost may be evaluated when selecting a site. For example, if one site is more expensive than other fulfillment site for a particular order (i.e., based on all of the order variables such as printing type, paper type, etc), then the less expensive site may be selected. Various other data may be evaluated to select a site while still complying with the underlying principles of the invention.

Said another way, step 205 selects all fulfillment sites which are capable of processing the stationery order and step 207 selects an optimal fulfillment site based on one or more stationery order variables.

At 208, metadata is routed to the optimal fulfillment site. As mentioned above, the metadata may be contained within an XML file and may specify the variables for the print job such as the network location of the print file on the stationery service 100 (e.g., a URI), the number of prints to be made for the stationery order, the names/addresses of the stationery recipients, the paper type, and the print type, to name a few.

At 209, the fulfillment site transmits a request for the print file from the online stationery service 100 at the network location provided as metadata. In one embodiment, the print file is a PDF file which, at 210 is transmitted from the online stationery service 100 to the fulfillment site. At 211, the fulfillment site prints the personalized stationery design and envelopes using the art file and, at 212, mails the stationery in the envelopes to the addressees printed on the envelopes, or to the end user who placed the order. Finally, at 213, upon receiving notice that the order has shipped, the online stationery service 213 updates the order status within the database (i.e., as "completed" or "shipped").

Throughout the discussion above, various details have been omitted to avoid obscuring the pertinent aspects of the invention. For example, in an embodiment of the invention in which the user connects to the online stationery service 100 via a Web browser, various well known functional modules associated within the presentation and session management logic 105 shown in FIG. 1 are executed to receive input, process the input and dynamically generate Web pages containing the results. The Web pages may be formatted according to the well known HyperText Markup Language ("HTML") or Extensible HTML ("XHTML") formats, and may provide navigation to other Web pages via hypertext links. Web pages are requested, dynamically generated, and transmitted from Web servers on the online stationery service 100 using the Hypertext Transfer Protocol (HTTP). One embodiment of the invention employs application software written in PHP (a well known scripting language designed for producing dynamic web pages) running on Apache™ Web servers served off Linux platforms. In addition, in one embodiment, the databases described herein are MySQL databases. It should be noted, however, that the underlying principles of the invention are not limited to any particular type of communications protocol or network architecture.

Additionally, various details associated with the order processor 142 and fulfillment sites 183-184 have been omitted to avoid obscuring the underlying principles of the invention. In one embodiment, these entities communicate via standard Web services or HTTP communication connections which occur over the Internet (i.e., with TCP/IP as the underlying network/transport protocol). For example, the online stationery service may initially discover the operations and protocols required by each fulfillment site's Web services by reading the Web Services Description Language (WSDL) file provided by each fulfillment site. Various other Web services protocols such as REpresentational State Transfer (REST) protocols may be employed while still complying with the underlying principles of the invention.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules such as wizards and other logic may be implemented as software, hardware or any combination thereof. Accordingly, the scope and spirit of the invention should be judged in terms of the claims which follow.

What is claimed is:

1. A computer-implemented method for fulfilling stationery products by a network-based personalized stationery system, comprising:

providing a user with a set of stationery templates by a network-based personalized stationery system comprising one or more computer servers;

allowing the user to use the one of the stationery templates to generate a personalized stationery design for a stationery product having a stationery product size and a paper type;

storing types of stationery products, stationery product sizes, paper types, and a geographic location in association with each of a plurality of fulfillment sites;

selecting, among the plurality of fulfillment sites, a set of eligible fulfillment sites based on the types of stationery products, the stationery product sizes, and the paper types associated with each of the plurality of fulfillment sites, wherein the set of eligible fulfillment sites are capable of printing and finishing the stationery product based on the personalized stationery design; and selecting, by the network-based personalized stationery system, an eligible fulfillment site in the set of eligible fulfillment sites to produce the stationery product based on the geographic locations of the respective eligible fulfillment sites.

2. The computer-implemented method of claim 1, further comprising:

receiving, from the user, personalization data comprising a personalized message, a name and an address of a stationery recipient, a user-selected stationery formatting option for the one of the stationery templates selected by the user.

3. The computer-implemented method of claim 2, wherein the eligible fulfillment site is selected in the set of eligible fulfillment sites to produce the stationery product based on the geographic locations of the respective eligible fulfillment sites and the address of the stationery recipient.

4. The computer-implemented method of claim 3, wherein the eligible fulfillment site whose geographic location is closer to the address of the stationery recipient is selected in the set of eligible fulfillment sites for the production of the stationery product.

5. The computer-implemented method of claim 2, further comprising:

applying the personalization data to the one of the stationery templates selected by the user to generate the personalized stationery design.

6. The computer-implemented method of claim 1, wherein the types of stationery products comprise one or more of digital press card, address label, gift tag, thermography card, photo gifts, canvas gifts, envelopes, gift certificates, or mint tins.

7. The computer-implemented method of claim 1, wherein the types of stationery products specify whether a return address is printed for mailing the stationery product.

8. The computer-implemented method of claim 1, wherein the stationery product sizes comprise 5"×7", 3.5"×5", or 4"×9" for flat cards or folded cards.

9. The computer-implemented method of claim 1, wherein the paper types comprise 80 lb or 110 lb paper stock.

10. The computer-implemented method of claim 1, further comprising:
producing a printing file in PDF format in accordance with the personalized stationery design; and
sending the printing file to the eligible fulfillment site selected by the network-based personalized stationery system.

11. The computer-implemented method of claim 1, further comprising:
producing a proof file in accordance with the personalized stationery design, the proof file adapted to be previewed by the user.

12. The computer-implemented method of claim 11, wherein the proof file is in JPEG format.

13. A computer-implemented method for fulfilling stationery products by a network-based personalized stationery system, comprising:
providing a user with a set of stationery templates by a network-based personalized stationery system comprising one or more computer servers;
allowing the user to use the one of the stationery templates to generate a personalized stationery design for a stationery product having a stationery product size and a paper type;
receiving from the user, by the network-based personalized stationery system, a name and an address of a stationery recipient for the stationery product;
storing types of stationery products, stationery product sizes, paper types, and a geographic location in association with each of a plurality of fulfillment sites;
selecting, among the plurality of fulfillment sites, a set of eligible fulfillment sites based on the types of stationery products, the stationery product sizes, and the paper types associated with each of the plurality of fulfillment sites, wherein the set of eligible fulfillment sites are capable of printing and finishing the stationery product based on the personalized stationery design; and
selecting, by the network-based personalized stationery system, an eligible fulfillment site in the set of eligible fulfillment sites to produce the stationery product based on the address of the stationery recipient and the geographic locations of the respective eligible fulfillment sites.

14. The computer-implemented method of claim 13, wherein the eligible fulfillment site which is closer to the address of the stationery recipient is selected in the set of eligible fulfillment sites for the production of the stationery product.

15. The computer-implemented method of claim 13, wherein the eligible fulfillment site is selected in the set of eligible fulfillment sites for the production of the stationery product based on the shipping costs from the respective eligible fulfillment sites to the address of the stationery recipient.

16. The computer-implemented method of claim 13, wherein the types of stationery products comprise one or more of digital press card, address label, gift tag, thermography card, photo gifts, canvas gifts, envelopes, gift certificates, or mint tins.

17. The computer-implemented method of claim 13, wherein the types of stationery products specify whether a return address is printed for mailing the stationery product.

18. The computer-implemented method of claim 13, wherein the stationery product sizes comprise 5"×7", 3.5"×5", or 4"×9" for flat cards or folded cards.

19. The computer-implemented method of claim 13, wherein the paper types comprise 80 lb or 110 lb paper stock.

* * * * *